US005314926A

United States Patent [19]
Robin et al.

[11] Patent Number: 5,314,926
[45] Date of Patent: May 24, 1994

[54] HYDROFLUOROCARBON COMPOSITIONS AS BLOWING AGENTS FOR CELLULAR PLASTICS

[75] Inventors: Mark L. Robin; Yuichi Iikubo, both of West Lafayette; W. Douglas Register, Lafayette; Richard S. Rose, West Lafayette, all of Ind.

[73] Assignee: Great Lakes Chemical Corporation, W. Lafayette, Ind.

[21] Appl. No.: 131,974

[22] Filed: Oct. 4, 1993

Related U.S. Application Data

[62] Division of Ser. No. 37,029, Mar. 25, 1993, Pat. No. 5,278,196.

[51] Int. Cl.$^5$ ................................. C08J 9/14
[52] U.S. Cl. ......................... 521/98; 264/53; 264/DIG. 5; 521/131; 521/910
[58] Field of Search ............... 521/98, 131, 910; 264/53, DIG. 5

[56] References Cited

U.S. PATENT DOCUMENTS

| | | | |
|---|---|---|---|
| 3,725,317 | 4/1973 | Ronden et al. | 521/79 |
| 5,084,487 | 1/1992 | Becker et al. | 521/159 |
| 5,182,040 | 1/1993 | Bartlett et al. | 521/98 |
| 5,187,206 | 2/1993 | Volkert et al. | 521/129 |
| 5,205,956 | 4/1993 | Volkert et al. | 521/98 |
| 5,221,492 | 6/1993 | Bartlett | 264/53 |

Primary Examiner—Morton Foelak
Attorney, Agent, or Firm—Woodard, Emhardt, Naughton, Moriarty & McNett

[57] ABSTRACT

Blowing agents for use in foamable plastics such as polystyrene, polyvinyl chloride, polyethylene and other non-polyisocyanate-based foams, comprising a mixture of 1,1,1,2,3,3,3-heptafluoropropane in combination with one or more hydrocarbons or partially halogenated alkanes. In one aspect of the invention the hydrocarbon adjuvant is selected from the group consisting of propane, butane, isobutane, n-pentane, i-pentane, neopentane, n-hexane, 2-methylpentane, 3-methylpentane and 2,2-dimethylbutane. In another aspect of the invention the halogenated alkane is selected from the group consisting of ethyl chloride, 2,2-dichloro-1,1,1-trifluoroethane (HCFC-123), 1,1-dichloro-1-fluoroethane (HCFC-141b), 1-chloro-1,1-difluoroethane (HCFC-142b), 2-chloro-1,1,1,2-tetrafluoroethane (HCFC-124), 3,3-dichloro-1,1,1,2,2-pentafluoropropane (HCFC-225ca), 1,3-dichloro-1,1,2,2,3-pentafluoropropane (HCFC-225cb), 1,1-difluoroethane (HFC-152a), 1,1,1-trifluoroethane (HFC-143a), 1,1,1,2-tetrafluoroethane (HFC-134a), 1,1,2,2-tetrafluoroethane (HFC-134), 1,1,2,2,3-pentafluoropropane (HFC-245ca), 1,1,1,2,3,3-hexafluoropropane (HFC-236ea), and 1,2,3,3-pentafluoropropane (HFC-245ea).

5 Claims, No Drawings

HYDROFLUOROCARBON COMPOSITIONS AS BLOWING AGENTS FOR CELLULAR PLASTICS

This application is a division of application Ser. No. 08/037,029, filed Mar. 25, 1993, U.S. Pat. No. 5,278,196.

BACKGROUND OF THE INVENTION

1. Field of the Invention

The present invention relates generally to blowing agent compositions, and more particularly the use of said compositions in non-polyisocyanate-based foams.

2. Description of the Prior Art

The use of blowing agents in the production of cellular plastics is well established. Plastics in cellular form have a number of advantages over non-expanded materials, especially with respect to cost, weight reduction and insulating ability.

In the past, two types of blowing agents have been employed in virtually all cellular plastics production. The first type consists of low boiling inert liquids that evaporate under the exotherm of polymer formation or upon the release of pressure during processing at elevated temperature. Examples of such low boiling inert liquids include butane, pentane and trichlorofluoromethane. These hydrocarbon blowing agents are highly flammable, and are also undesirable due to their classification as photochemically reactive volatile organic compounds (VOCs) which contribute to photochemical smog.

The second type of blowing agents includes those that are formed by a chemical reaction or by thermal decomposition of a compound. An example of the former is the formation of $CO_2$ from the reaction of water and isocyanate in the production of flexible polyurethane foam, while an example of the latter is the decomposition of azidocarbonamide to form nitrogen, which is employed to expand vinyl chloride, low density polyethylene, and a number of other polymers.

Historically, chlorofluorocarbons (CFCs) such as dichlorodifluoromethane (CFC-12) and trichlorofluoromethane (CFC-11) have been employed as the blowing agents of choice for polymeric foams. However, such completely halogenated molecules have been implicated in the destruction of stratospheric ozone, and due to their high ozone depletion potential (ODP), CFCs, including CFC-11 and CFC-12, are slated for phase-out by the end of the century.

Hydrochlorofluorocarbons (HCFCs) such as 1,1-dichloro-1-fluoroethane (HCFC-123) which contain at least one hydrogen atom are less damaging to stratospheric ozone in comparison to the CFCs. However, as indicated above, although these blowing agents have ODPs of zero they are highly flammable, and are also less desirable due to their classification as photochemically reactive volatile organic compounds which contribute to photochemical smog.

An additional problem associated with the use of certain blowing agents is that of compatibility of the blowing agent composition with the additional components of the foam blowing system. Applications requiring multi-component liquid systems must form stable solutions in order to produce homogeneous foams. Efforts to incorporate some blowing agents of the prior art have resulted in the separation of components and poor cell structure in the expanded foam.

A need therefore exists for novel blowing agents which are non-toxic, nonflammable, compatible with system components and environmentally acceptable. The present invention addresses that need.

SUMMARY OF THE INVENTION

Briefly describing one aspect of the present invention, there are provided blowing agents for use in foamable plastics such as polystyrene, polyvinyl chloride, polyethylene and other non-polyisocyanate-based foams, comprising a mixture of 1,1,1,2,3,3,3-heptafluoropropane in combination with one or more hydrocarbons or partially halogenated alkanes. In one preferred aspect of the invention the hydrocarbon adjuvant is selected from the group consisting of propane, butane, isobutane, n-pentane, i-pentane, neopentane, n-hexane, 2-methylpentane, 3-methylpentane and 2,2-dimethylbutane. In another preferred aspect of the invention the halogenated alkane is selected from the group consisting of ethyl chloride, 2,2-dichloro-1,1,1-trifluoroethane (HCFC-123), 1,1-dichloro-1-fluoroethane (HCFC-141b), 1-chloro-1,1-difluoroethane (HCFC-142b), 2-chloro-1,1,1,2-tetrafluoroethane (HCFC-124), 3,3-dichloro-1,1,1,2,2-pentafluoropropane (HCFC-225ca), 1,3-dichloro-1,1,2,2,3-pentafluoropropane (HCFC-225cb), 1,1-difluoroethane (HFC-152a), 1,1,1-trifluoroethane (HFC-143a), 1,1,1,2-tetrafluoroethane (HFC-134a), 1,1,2,2-tetrafluoroethane (HFC,134), 1,1,2,2,3-pentafluoropropane (HFC-245ca), 1,1,1,2,3,3-hexafluoropropane (HFC-236ea), and 1,1,2,3,3-pentafluoropropane (HFC-245ea).

One object of the present invention to provide novel blowing agent compositions which are nontoxic, chemically stable, of reduced or zero flammability, and which present no adverse threat to stratospheric ozone.

A further object of the present invention is to provide blowing agent compositions with improved compatibility in liquid systems.

Further objects of the invention will become apparent from the following description.

DESCRIPTION OF THE PREFERRED EMBODIMENTS

For the purposes of promoting an understanding of the principles of the invention, reference will now be made to the preferred embodiments thereof, and specific language will be used to describe the same. It will nevertheless be understood that no limitation of the scope of the invention is thereby intended, such alterations, modifications, and further applications of the principles of the invention being contemplated as would normally occur to one skilled in the art to which the invention relates.

The present invention relates to blowing agent compositions and methods for the use of said compositions in the production of cellular plastics such as polystyrene, polyvinyl chloride, polyethylene and other non-polyisocyanate-based foams. In accordance with the invention, the blowing agents comprise (i) 1,1,1,2,3,3,3-heptafluoropropane (HFC-227ea) and (ii) one or more hydrocarbons or partially halogenated alkanes. The compositions comprise from about 5 to 95 weight percent HFC-227ea and from about 95. to 5 weight percent of the second compound.

Suitable hydrocarbons may contain up to eight carbon atoms, and may be straight-chain, branched or cyclic. Specific examples of suitable hydrocarbons include propane, butane, isobutane, n-pentane, i-pentane, neopentane, n-hexane, 2-methylpentane, 3-methylpentane and 2,2-dimethylbutane.

Suitable partially halogenated alkanes have boiling points of less than approximately 50° C., and generally contain four or less carbon atoms. Specific examples of suitable halogenated alkanes include ethyl chloride, 2,2-dichloro-1,1,1-trifluoroethane (HCFC-123), 1,1-dichloro-1-fluoroethane (HCFC-141b), 1-chloro-1,1-difluoroethane (HCFC-142b), 2-chloro-1,1,1,2-tetrafluoroethane (HCFC-124), 3,3-dichloro-1,1,1,2,2-pentafluoropropane (HCFC-225ca), 1,3-dichloro-1,1,2,2,3-pentafluoropropane (HCFC-225cb), 1,1-difluoroethane (HFC-152a), 1,1,1-trifluoroethane (HFC-143a), 1,1,1,2-tetrafluoroethane (HFC-134a), 1,1,2,2-tetrafluoroethane (HFC-134), 1,1,2,2,3-pentafluoropropane (HFC-245ca), 1,1,1,2,3,3-hexafluoropropane (HFC-236ea), and 1,1,2,3,3-pentafluoropropane (HFC-245ea).

It is a feature of one aspect of the present invention that HFC-227ea in combination with a second compound which is itself flammable can yield a nonflammable mixture suitable for use as a foam blowing agent. In a preferred embodiment of the invention, the foam blowing compositions comprise from about 60 to about 95 weight percent HFC-227ea, and from about 5 to about 40 weight percent of a second, flammable compound selected from the group consisting of 1,1-dichloro-1-fluoroethane (HCFC-141b), 1-chloro-1,1-difluoroethane (HCFC-142b), 1,1-difluoroethane (HFC-152a), 1,1,1-trifluoroethane (HFC-143a), propane, butane, isobutane, n-pentane, i-pentane, neopentane, n-hexane, 2-methylpentane, 3-methylpentane and 2,2-dimethylbutane. Mixtures containing larger percentages of HFC-227ea exhibit wider ranges of nonflammability, and hence reduce or eliminate entirely the associated fire hazard otherwise present during the foam production process. In the case of HFC-227ea/hydrocarbon mixtures, in addition to providing a nonflammable foam blowing composition, the compositions contribute less to photochemical smog, due to their reduced hydrocarbon content.

A further feature of the present invention is the discovery that relatively small amounts of HFC-227ea in admixture with a flammable adjuvant provide foams with flammability characteristics greatly improved over those of foams produced employing the flammable adjuvants as blowing agents. As little as 5 weight percent of HFC-227ea in combination with a flammable adjuvant can produce a foam with flammability characteristics only slightly less desirable than those of foams blown with CFC-11.

Additional compositions of this invention of particular advantage are those of HFC-227ea and the HFCs 1,1-difluoroethane (HFC-152a), 1,1,1-trifluoroethane HFC-143a), 1,1,1,2-tetrafluoroethane (HFC-134a), 1,1,2,2-tetrafluoroethane (HFC-134), 1,1,2,2,3-hexafluoropropane (HFC-245ca), 1,1,1,2,3,3-pentafluoropropane (HFC-236ea), and 1,1,2,3,3-pentafluoropropane (HFC-245ea). Neither component of said mixtures contains chlorine, and hence the compositions are characterized by an ODP of zero. In addition, the HFCs are not classified as volatile organic compounds, and hence these compositions are characterized by the further advantage that they do not contribute to photochemical smog.

Compositions of the present invention consisting of HFC-227ea in admixture with the HCFCs 2,2-dichloro-1,1,1-trifluorethane (HCFC-123), 1,1-dichloro-1-fluoroethane (HCFC-141b), 1-chloro-1,1-difluoroethane (HCFC-142b), 2-chloro-1,1,1,2-tetrafluoroethane (HCFC-124), 3,3-dichloro-1,1,1,2,2-pentafluoropropane (HCFC-225ca), and 1,3-dichloro-1,1,2,2,3-pentafluoropropane (HCFC-225cb), are also suitable blowing agents. Although such mixtures are characterized by a nonzero ODP, the use of greater proportions of HFC-227ea allows for a significant reduction in the ODP compared to the pure HCFC.

The compositions of the present invention which are comprised of HFC-227ea and a hydrocarbon are advantageous with respect to compatibility. A problem associated with the use of partially fluorinated hydrocarbons as blowing agents is their lack of compatibility with the other components of the foam-blowing composition. By combining HFC-227ea with a hydrocarbon, this compatibility problem can be minimized. Hence, employing a blend of HFC-227ea and a hydrocarbon as the blowing agent, good compatibility is achieved while simultaneously providing a reduced flammability hazard and improved environmental acceptability in comparison to the presently employed CFC based blowing agents.

Certain of the blowing agent compositions are preferred over others. For example, blowing agents comprising (a) 1,1,1,2,3,3,3-heptafluoropropane, and (b) a halohydrocarbon selected from the group consisting of 2-chloro-1,1,1,2-tetrafluoroethane (HCFC-124), 1,1,2,2-tetrafluoroethane (HFC-134), and 1-chloro-1,1-difluoroethane (HCFC-142b) are especially preferred for certain applications. In other embodiments, 1,1,1,2,3,3-pentafluoropropane (HFC-236ea) may be particularly preferred. These preferred blowing agent compositions are also effective when used in polyurethane-based foams.

In addition, certain non-polyisocyanate-based polymers are preferred. For example, polystyrene, polyvinyl chloride and polyethylene are especially preferred for use with the blowing agents of the present invention.

It should be understood that the present foam-blowing compositions may include additional, non-interfering components such as acid scavengers, so as to form new foam-blowing compositions. Any such compositions are considered to be within the scope of the present invention.

Reference will now be made to specific examples using certain blowing agents as described above. It is to be understood that the examples are provided to more completely describe preferred embodiments, and that no limitation to the scope of the invention is intended thereby.

EXAMPLE 1

This example demonstrates the efficient fire suppression characteristics of HFC-227ea. The concentration of HFC-227ea required to inert various flammable compounds was measured in an 8.0 L explosion sphere, consisting of two 304 stainless hemispheres welded on stainless steel flanges, and equipped with instrumentation allowing the monitoring of pressure and temperature as a function of time. Mixtures of the flammable compound and air and the desired concentration of the inerting agent HFC-227ea were introduced into the sphere employing partial pressures to determine the volumes of agent, fuel and air. The mixtures were then subjected to a DC spark of 70 J ignition energy, located in the center of the sphere. Mixtures producing an overpressure of greater than or equal to 1.0 psia following activation of the spark are considered flammable, and mixtures producing an overpressure of less than 1.0 psia are considered nonflammable. By examining a series of mixtures of varying ratios of air/fuel/HFC-227ea, the concentration of HFC-227ea required to inert all combinations of the fuel and air can be determined. Test results are shown in Table 1.

TABLE 1

| Fuel | Flammability Limits | | Inerting Concentration |
|---|---|---|---|
| | lower % | upper % | HFC-227ea, % v/v |
| Propane | 2.1 | 9.7 | 11.6 |
| Pentane | 1.5 | 7.4 | 11.6 |
| HFC-32 | 14 | 31 | 3.6 |
| HFC-152a | 5.1 | 17.2 | 8.7 |

EXAMPLE 2

This example demonstrates the use of the compositions of the present invention for the production of polystyrene foams. A polystyrene foam was produced by dissolving 100 parts by weight of crystal polystyrene in 30 parts methylene chloride. A total of 2 parts pentane and 1 part HFC-227ea, 0.05 parts tricalcium phosphate and 0.8 parts bis-allyl ether of tetrabromo bisphenol A was then added. The blend was mixed on a drum roller and poured into shallow pans in thin layers. After standing overnight these flexible plastic films were cut into 2"×6" strips and immersed in water. The strips expanded rapidly and were dried to constant weight in a 50° C. oven. Final density was 2.0 to 2.6 lb/ft$^3$. A second preparation, utilizing 2.45 parts penfane, yielded foams in the same density range and exhibiting the same cell structure. Flammability results of HF-1 in the UL-94 horizontal test and oxygen index values of 31 were obtained for both sets of foams.

EXAMPLES 3-6

These examples demonstrate the use of the compositions of the present invention for the production of polyolefinic foams. Polyethylene foams are produced generally according to known methods for preparing such foams, using blowing agents comprising blends of 1,1,1,2,3,3,3-heptafluoropropane (HFC-227ea) and a member of the group consisting of 2-chloro-1,1,1,2-tetrafluoroethane (HCFC-124), 1,1,2,2-tetrafluoroethane (HFC-134), 1-chloro-1,1-difluoroethane (HCFC-142b), and 1,1,1,2,3,3-hexafluoropropane (HFC-236ea). The resultant foams exhibit satisfactory density and cell structure. Desirable flammability test results and oxygen index values obtain for all four polyolefinic foams.

While the invention has been illustrated and described in detail in the foregoing description, the same is to be considered as illustrative and not restrictive in character, it being understood that only the preferred embodiments have been shown and described and that all changes and modifications that come within the spirit of the invention are desired to be protected.

We claim:

1. A polymer foam which is essentially free of polyisocyanate based polymers comprising:
    a blowing agent consisting essentially of 1,1,1,2,3,3,3-heptafluoropropane and a halohydrocarbon selected from the group consisting of 2-chloro-1,1,1,2-tetrafluoroethane (HCFC-124), 1,1,2,2-tetrafluoroethane (HFC-134), 1-chloro-1,1,-difluoroethane (HCFC-142b) and 1,1,1,2,3,3-hexafluoropropane (HFC-236ea).

2. A polymer foam according to claim 1, wherein said blowing agent consists essentially of 1,1,1,2,3,3,3-heptafluoropropane and 2-chloro-1,1,1,2-tetrafluoroethane (HCFC-124).

3. A polymer foam according to claim 1, wherein said blowing agent consists essentially of 1,1,1,2,3,3,3-heptafluoropropane and 1,1,2,2-tetrafluoroethane (HFC-134).

4. A polymer foam according to claim 1, wherein said blowing agent consists essentially of 1,1,1,2,3,3,3-heptafluoropropane and 1-chloro-1,1-difluoroethane (HCFC-142b).

5. A polymer foam according to claim 1, wherein said blowing agent consists essentially of 1,1,1,2,3,3,3-heptafluoropropane and 1,1,1,2,3,3-hexafluoropropane (HFC-236ea).

* * * * *